United States Patent [19]
Fichou et al.

[11] Patent Number: 5,790,522
[45] Date of Patent: Aug. 4, 1998

[54] METHOD AND SYSTEM FOR PERFORMING TRAFFIC CONGESTION CONTROL IN A DATA COMMUNICATION NETWORK

[75] Inventors: Aline Fichou, La Colle Sur Loup; Claude Galand, Cagnes Sur Mer, both of France; Ilias Iliadis, Ruschlikon, Switzerland; Xavier Jacquart, Vence, France; Philippe Louis, Nice, France; Victor Spagnol, Cagnes Sur Mer, France; Edward Suffern, Chapel Hill, N.C.

[73] Assignee: International Business Machines Corporation, Armonk, N.Y.

[21] Appl. No.: 494,135

[22] Filed: Jun. 23, 1995

[30] Foreign Application Priority Data

Oct. 7, 1994 [EP] European Pat. Off. .............. 94480097

[51] Int. Cl.$^6$ ................................................ H04L 12/56
[52] U.S. Cl. ...................... 370/236; 370/413; 370/468
[58] Field of Search ............................ 370/13, 17, 60, 370/60.1, 94.2, 84, 85.6, 229, 230, 236, 395, 398, 465, 468, 412, 413, 414, 415, 416

[56] References Cited

U.S. PATENT DOCUMENTS

| | | | |
|---|---|---|---|
| 5,268,900 | 12/1993 | Hluchyj et al. | 370/85.6 |
| 5,475,682 | 12/1995 | Choudhury et al. | 370/412 |
| 5,550,823 | 8/1996 | Irie et al. | 370/60.1 |
| 5,570,348 | 10/1996 | Holden | 370/17 |

FOREIGN PATENT DOCUMENTS

| | | |
|---|---|---|
| 0609114 | 8/1994 | European Pat. Off. . |
| 9320637 | 10/1993 | WIPO . |

OTHER PUBLICATIONS

Computer Networks and ISDN Systems, vol. 26, No. 9, May 1994, Amsterdam NL pp 1187–1213, XP445890 H. Badran et al. 'ATM switch architecture with inout–output–buffering: effect of input traffic correlation, contention resolution policies, buffer allocation strategies and delay in backpressure signal'.

IEEE INFOCOM'93 The Conference on Computer Communications. vol.3, 28 Mar. 1993, San Francisco, US pp. 1330–1336, XP336076 H. Inai et al. 'Analysis of ON–OFF Source Shaping for ATM Multiplexing'.

IEICE Transactions, vol. E75–B, No. 11 Nov. 1992, Tokyo JP pp. 1199–1207, XP336076 H. Inai et al. 'RAte–based Congestion Control in High Speed Packet–Switching Networks'.

Primary Examiner—Chau Nguyen

[57] ABSTRACT

Traffic congestion control is provided for a network node multiport switch capable of switching data packets of different priorities from input lines, via receive adapters, to output lines via transmit adapters. A spacing function is performed to limit the rate of data transfers through the switch in the absence of high priority data at the input lines and in the absence of a backpressure signal indicating the switch is congested at its output. If high priority data is detected or a backpressure signal has been generated, the data transfer rate is increased to deal with possible congestion.

8 Claims, 9 Drawing Sheets

METHOD AND SYSTEM FOR PERFORMING TRAFFIC CONGESTION CONTROL IN A DATA COMMUNICATION NETWORK

FIELD OF THE INVENTION

This invention relates to a method and system for performing traffic congestion control in a data communication network and more particularly to an improvement in performing such congestion control at network node switch level in a packet switching environment.

BACKGROUND OF THE INVENTION

Effective modern digital networks must be capable of operating in a multimedia environment in which they must transport different types of data, representing alphanumeric files as well as voice, image, video, etc., over the same network media. The operation of the networks should satisfy dissimilar requirements specific to each of these kinds of data.

Data can be divided into different types. One type is non-real-time data, i. e. alphanumeric data that can be delivered to an end-user without loss of quality even if delayed. Another type is real-time information (such as voice or video data) that must be transmitted to the end-user without excessive time delays. If the data cannot be transferred within the allowable delay period, it is discarded rather than allow it to distort reconstructed end user information, such as speech or video displays.

A specific type of non-real-time information is non-reserved information such as control information that arrives periodically in the network. This type of information has no significant time constraints on its delivery.

Different techniques have been developed for transporting data, such as packet switching techniques where digitized data is transported in individual fixed or variable length packets, and circuit switching techniques.

A basic advantage of packet switching compared to circuit switching is that packet switching permits multiplexing of data of different types or from different sources onto a link, which optimizes utilization of the link's capacity. A drawback of packet switching compared to circuit switching is that packet switching may result in delayed delivery of some packets in the data stream, adversely affecting the quality of reconstructed real-time information, such as voice or video information, at the destination. It is known to control a network in such a way that packet delay is regulated by considering the impact of every new connection that is to be established across a packet switched network. If a new connection would drive packet delay beyond acceptable limits, the request for establishment of that connection will probably be rejected. For convenience, such a known method is briefly described here.

FIG. 1 shows a sample packet switching network including seven switching nodes SW_1 to SW_7 interconnected by trunk lines (TL's), that can be accessed by access lines (AL's) connected to outside data terminal equipment (DTE's).

The network control architecture is a distributed one, which means that each switching node is controlled by a control point CP. All CP's are interconnected through the trunk lines via a control point spanning tree CPST which provides an efficient means for multicasting control messages between the control points. When a CP wants to broadcast a message to other CP's in the network, it sends this message to the predefined CPST switching address, and the architecture provides the means to route this message on every line of the CP spanning tree, and only on these lines. This architecture also provides the means to initialize the tree address on each switching node, and to automatically reconfigure the tree in case of line or switching node failure.

Each CP includes a copy of the topology database that contains information about the network. It includes the network physical configuration, the line characteristics and current status. For every line n in the network, the line delay T(n) and bandwidth R_res(n) of this line are defined and recorded in the topology database. This information is distributed to other control points via topology update messages sent over the control point spanning tree whenever it presents significant changes.

For more information on such a Spanning Tree organization, one may refer to the Copending European Patent Application number 94480048.1 filed on 25 May 1994.

Also shown in FIG. 1 are user terminal equipment DTE_A and DTE_B which are connected to the network via access lines AL_A and AL_B, respectively. This equipment is to be interconnected through the network with a given quality of service (QoS) specified in terms of a maximum allowable delay T_max and a packet loss probability P_loss.

At the switching node SW_1, the control point CP_1 first uses the QoS and the traffic characteristics specified by the user (such as peak rate, mean rate, average packet length) to compute the amount of bandwidth C_eq, called the equivalent capacity of the connection, to be reserved on every line on the route, in order to guarantee a packet loss probability P_1 (n) on this line which is much smaller than the loss_probability P_loss that has been specified for the connection.

Based on the information that is available on a line basis in the topology data base, the control point CP_1 then computes the best route through the network to the destination. The route selection process uses a modified Bellman-Ford algorithm to find the minimum weight, minimum hop count, route from the origin to the destination, using available lines and satisfying the QoS requirements.

Algorithms for determining the equivalent capacity parameters and the best route for a given message are known in the art. The algorithms are not essential to a description of the present invention and, therefore, will not be described further. For additional information on the algorithms, one may refer to the following publications:

R. Guérin, H. Ahmadi, M. Naghshineh, "Equivalent Capacity and its Application to Bandwidth Allocation in High Speed Networks", *IEEE Journal of Selected Areas in Communications*, JSAC-7, September 1991.

H. Ahmadi, J. S. Chen, R. Guérin, L. Gun, A. M. Lee and T. Tedijanto, "Dynamic Routing and Call Control in High-Speed Integrated Network", *Proc. Workshop Sys. Eng. Traf. Eng.*, ITC'13 pp 397–403, Copenhagen, Denmark.

Assume a selected route is to include switching nodes SW_1, SW_2, and SW_3. The origin control point CP_1 sends a connection set-up message along the route, causing a copy to be delivered to the control point of every switch on the route. This message contains a list of the network addresses of the control points on the route, the list of the line names between these control points, the requested bandwidth C_eq, the priority level of the connection, and a connection correlator C_cor which is set by the origin control point CP_1, and which is used by all other CP's to uniquely identify the connection.

Upon reception of a copy of the setup message, each control point reserves the necessary bandwidth on the trunk, creates a new entry in the connection table of the adapter, which is used for label swap purposes, and sends an acknowledgement back to the origin control point CP_1. When CP_1 has received an acknowledgement from every CP on the route, it starts the transmission of data over the connection.

For a specified QoS to be met for a connection, the proper amount of bandwidth must be reserved on each line on the route and, additionally, packets with different priorities, must be properly scheduled at each switching point.

FIG. 2 represents a switching node constructed in accordance with known art. The switching node includes receive adapters (20) which provide interfaces to input lines 1 through N and transmit adapter (22) providing interfaces to output lines 1 through N. While shown as separate devices in the drawing, the receive and transmit adapters might be combined into a single adapter device or be implemented by means of a programmable processor. A switch fabric (24) (also herein referred to as "switch") controls connections between the receive adapters and the transmit adapters.

The switch fabric is schematically represented in FIG. 3. It includes an input router section (31) for scanning the receive adapters and directing input data to output address queues (32) through a shared memory (33). A control section (34) is also provided to control the operation of both the shared memory (33) and the output address queues (32).

As shown in FIG. 2, a routing device 26 directs an incoming packet into a switch input queue (SIQ) (25) located in the receive adapter (20). The switch is assumed to be an Asynchronous Transfer Mode (ATM) switch, capable of switching ATM (fixed length) packets and variable length packets. A routing header for each incoming packet contains one bit which indicates whether a packet is an ATM packet or a variable length packet. A variable length packet is segmented by a receive switch interface RSI into fixed length ATM cells before those cells are processed by the switch fabric 24. The cells produced by segmentation of a variable length packet are switched by switch fabric 24 to the appropriate transmit adapter where they are reassembled into the original variable length packet form by the transmit switch interface XSI. Of course, ATM cells received at a receive adapter need not be segmented before switching or reassembled after switching; that is, ATM cells can be switched natively by the switch fabric 24.

It should be noted that the term "ATM packet" and "ATM cell" may refer to exactly the same data structure; namely a fixed length data unit having a multi-bit header structure of fixed length and a multi-bit data or payload structure which actually contains end user information.

At the transmit adapter, the packet may enter one of three possible queues, according to its priority. Three possible traffic priorities are defined, real-time (RT), non-real-time (NRT), and non-reserved (NR). Typically, the highest priority class (RT) is used to assigned to delay-sensitive data such as voice or video data, the second class (NRT) is assigned to delay-tolerant data such as interactive alphanumeric data, and the third class (NR) is assigned to delay-insensitive data such as network control information or low priority data operations such as bulk file transfers. The real-time RT priority level may itself include traffic of different sub-priority levels. Upon request from the transmit line, a scheduler (27) services the transmit adapter queues. More specifically, at every request from the transmit line for a new packet, the scheduler (27) first looks at the real-time queue and services a real-time packet stored in that queue.

If the real-time queue is empty, then the scheduler (27) looks at the non-real-time queue and services a non-real-time packet in that queue. The non-reserved queue is serviced only when both real-time and non-real-time queues are empty.

The routing operation at each switching node is implemented as follows. Switching labels allocated by CP_2 and CP_3 (see FIG. 1) will be identified as labels L2 and L3, respectively.

At the receive adapter, a network header is appended to the data packets that are received from the user equipment DTE_A. The network header contains the label L2, and a switch routing header that is used locally by switch SW_1 to route the packet to the desired transmit adapter for transmission over the line TL_1. At the next switch SW_2, the label L2 of each packet is used to access a look-up table which returns the label L3 and a switch routing header to be used by the switch fabric at SW_2. The new label L3 is swapped for the old label L2, and the packet is forwarded in accordance with the switch routing header to the appropriate transmit adapter for transmission on line TL_2.

The routing operations are repeated at each switching node until the packet reaches the destination transmit port adapter where the network header is discarded and the packet is sent to the user equipment DTE_B.

If the switch were an ideal switch, that is, an infinitely fast switch, the above routing operation, combined with the reservation of the equivalent capacity on the transmit trunk, would always ensure that a specified quality of service parameter (QoS) would be satisfied on a connection. In practice, however, the speed of the switch is limited, which leads to a requirement for some queuing at the switch fabric level as described with reference to FIG. 3.

A switch can route, in parallel, as many cells as the number of receive and transmit adapters connected to the switch. In the switch fabric core, the shared memory is used to store cells, and an address queue per output adapter is required. At every switch cell cycle, the control section (34) looks for an available adapter in a free address table (not shown) and provides as many free addresses as there are available adapters connected.

When a cell from a receive adapter "i" enters the switch, it is stored at an address that corresponds to that adapter. Once its destination "j" is determined, a pointer to the cell's storage address is added to the output address queue "j".

From a performance point of view, two characteristics are very important at switch level. One characteristic is a speed-up factor, defined by the ratio between internal switch speed and the speed of the attached lines. The second characteristic is the size of the shared memory in the switch fabric. Different designs can be implemented in order to optimize the switch behavior; for example, running the switch at a high speed switch or including a large memory for the switch.

For a speed-up factor of two and assuming the same attachment speed on all adapters, with shared memory capable of handling only a single cell, a switch could receive and forward a cell from each input adapter in a single cycle. On the other hand, with an infinitely large shared memory, a cell from each adapter could also be received and forwarded every cycle. In these two cases, the switch would have an ideal behavior.

Ideal solutions such as those described above would be expensive to implement, if they can be implemented at all. A high speed switching medium means expensive high speed adapter interfaces. An extremely large shared memory is costly to provide.

Given the cost and impracticality of ideal solutions, less than ideal solutions involving limited speed-up factor and limited memory size must be found. If the size of the shared memory is limited, contention for the available memory spaces may arise. Even if the switch speed is higher than the line speeds, switch resource contention may occur if cells from different receive adapters have the same destination and must be queued in the same output address queue. The switch will not have enough time in one cycle to empty its output queue. After several cycles, the switches' queue/ memory may become full. This case may occur frequently when large packets are processed as such packets are segmented into smaller fixed length cells, all of which are directed to the same output.

In practice, a backpressure signal (BP) can be generated and sent to input adapters when switch congestion is detected; that is, when the shared memory is full or the intended output queue is full. The existence of the backpressure signal indicates a cell has to be discarded at the switch and must be sent again.

SUMMARY OF THE INVENTION

The present invention relates to performing traffic congestion control in a data communication network made for transporting data packets of different priority levels through network nodes. Each of the nodes includes a switch fabric for switching the network data between receive adapters connected to network node input lines and transmit adapters connected to network node output lines. The switch fabric includes a switch congestion condition detector and a backpressure signal generator. The receive adapters include routing means for routing received data into different queues based on priority levels and for routing the queued data selectively at a predefined adapter speed through the switch. In providing congestion control, the queues are monitored to detect whether a predefined high priority queue is empty. If the high priority queue is empty, a spacing operation is set ON to set receiver adapter speed at a predefined low value. If the predefined high priority data queue is not empty, the spacing operation is overridden. The switch condition is monitored to detect the presence of a backpressure signal. If a backpressure signal is detected while the spacing operation is ON, the spacing operation is overridden.

BRIEF DESCRIPTION OF THE DRAWINGS

While the specification concludes with claims particularly pointing out and distinctly claiming that which is regarded as the present invention, further details, characteristics and advantages of preferred embodiments of the invention may be more readily apparent from the following detailed description when read with reference to the accompanying drawings wherein:

DETAILED DESCRIPTION OF PREFERRED EMBODIMENTS

Figure 1:
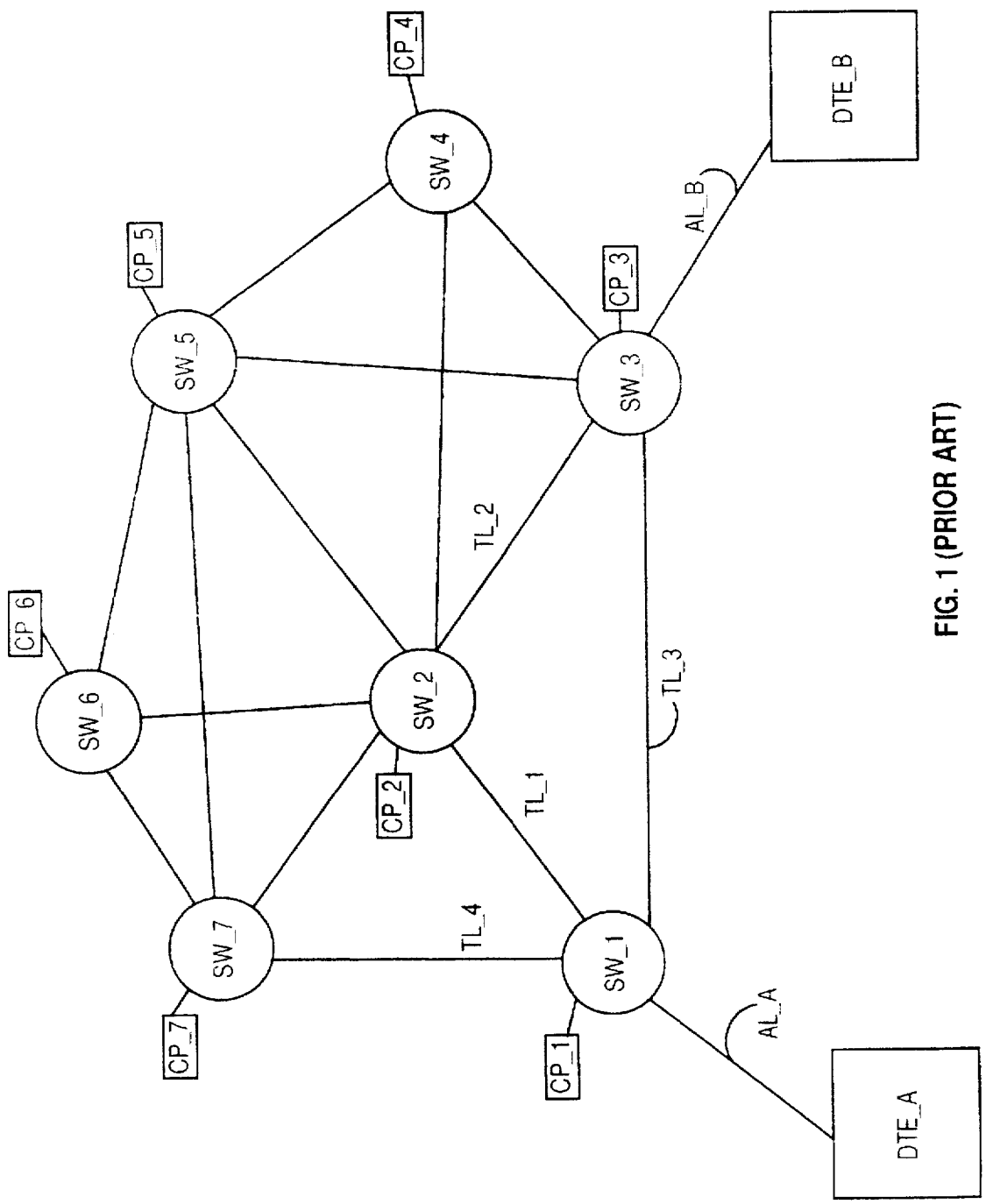
FIG. 1 is schematic representation of a data communication network in which congestion control may be practiced in accordance with this invention.
Figure 2:
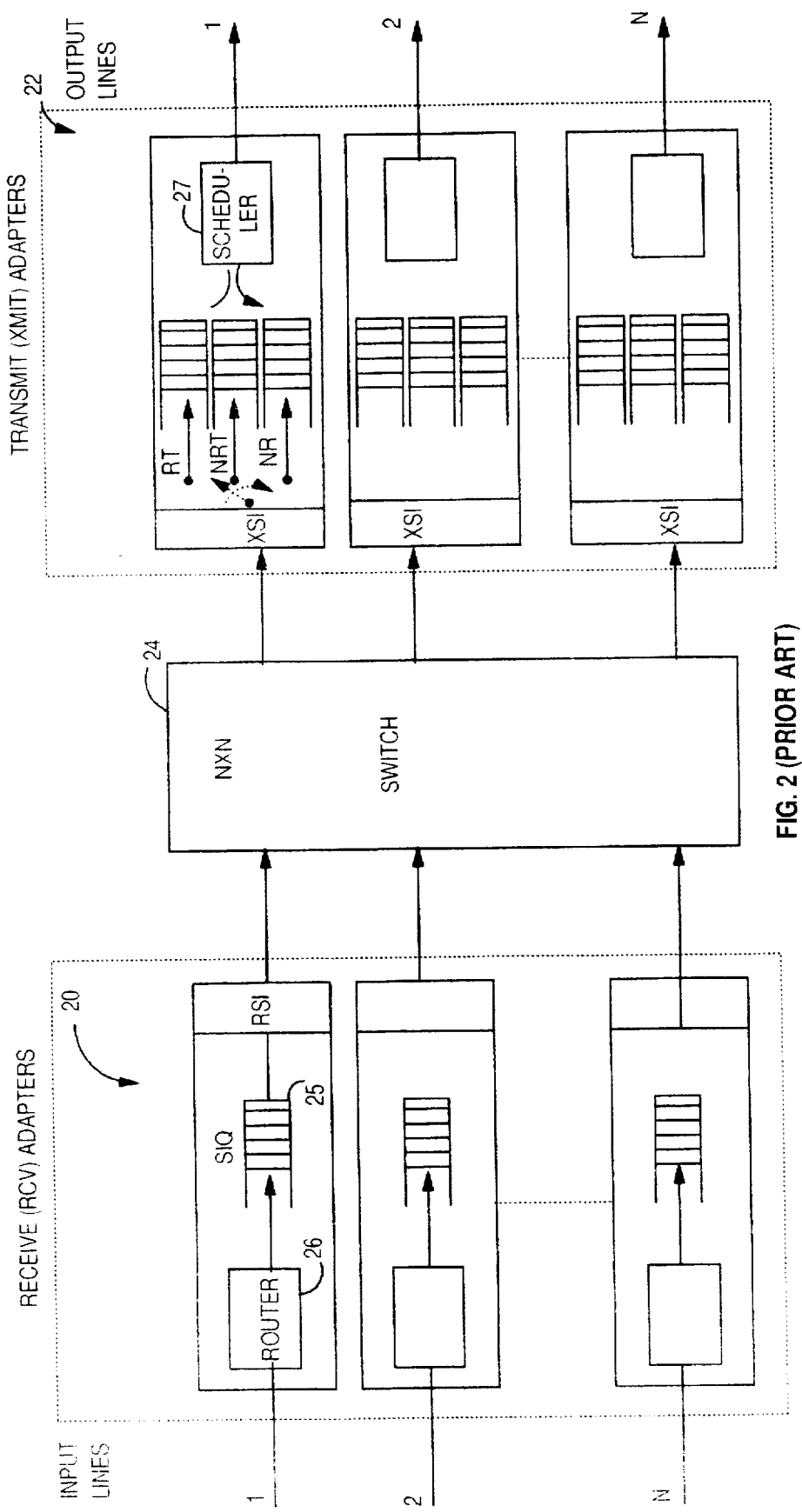
FIG. 2 is a schematic representation of the architecture of a switching node of the network of FIG. 1.
Figure 3:
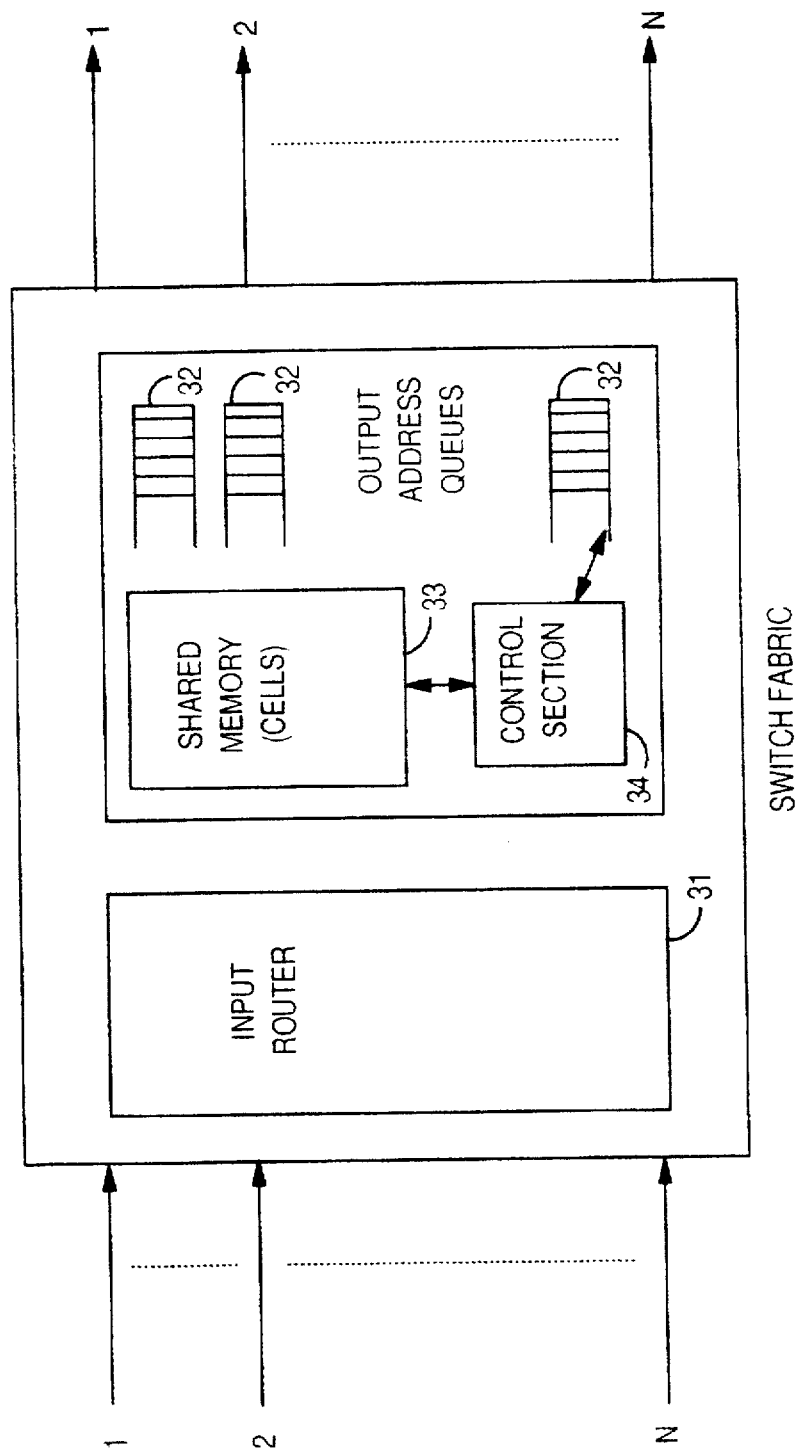
FIG. 3 is a schematic representation of the switch fabric of FIG. 2.
Figure 4:
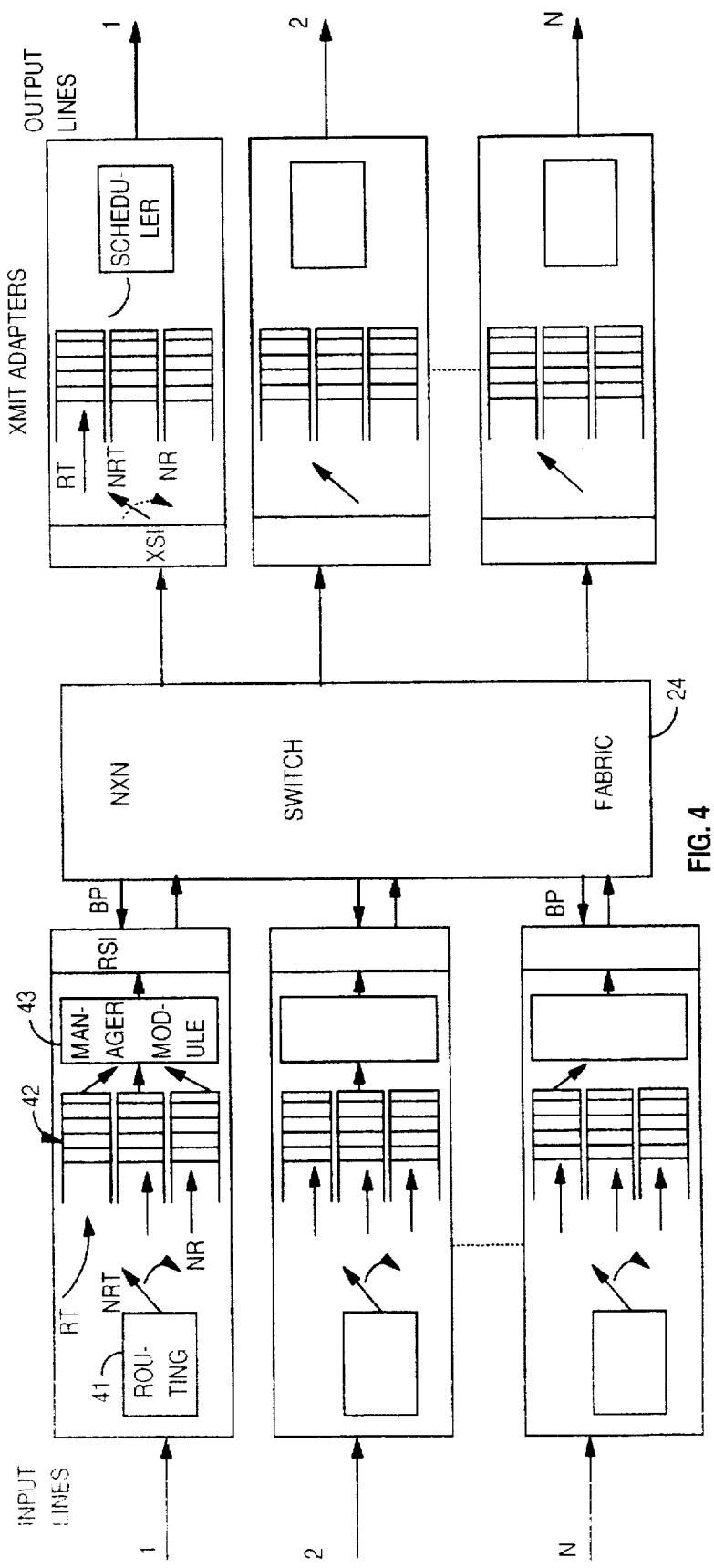
FIG. 4 is a schematic representation of a switching node modified to implement the present invention.

FIG. 4 is a schematic representation of a switching node modified to implement the present invention.

The input data in each receive adapter is first organized based on the previously mentioned priority criteria, differentiating between real-time (RT) data, and non-real-time data including, in the preferred embodiment as described herein, pure non-real-time data (NRT) and non-reserved traffic (NR). Each receive adapter includes an input routing system (41) with a switching mechanism for dispatching each received data packet into one of a set of buffers or storage queues, with each queue being dedicated to data having a specific priority level; that is, for handling RT, NRT and NR packets, respectively. A manager module (43) is also provided to control the traffic to be directed from the receive adapter queues (42) toward the switch fabric (24) via the receive switch interface (RSI). Routing and management operations are preferably controlled by dedicated software (e. g. picocode) stored in the system. In addition, the previously mentioned backpressure signal (BP), generated by the switch to signal a congestion condition, is also represented in this figure.

The use of separate queues for RT, NRT and NR data, respectively, avoids the situation of a higher priority packet/cell being embedded in a data stream following several lower priority packets, which can happen if only one input queue is provided. With separate queues for each priority level, a maximum of one lower priority packet may have to be transmitted before a received higher priority packet can be sent. The maximum queuing delay (and jitter) for a RT packet is given by:

$$\frac{\text{Maximum NR/NRT packet size}}{\text{switch speed}} \quad (1)$$

for multiple queues, while it is given by:

$$\frac{\text{Maximum NR/NRT queue size}}{\text{switch speed}} \quad (2)$$

for a single queue.

In practice, the use of three separate priority-based queues can reduce jitter and delay for a real time signal by a factor of 50.

However, while multiple queuing is one way to limit, within a given receive adapter, the impact of mixing low priority traffic and high priority traffic, it does not solve the switching problem caused where different receive adapters are processing data having different priority levels. In other words, NRT/NR traffic received through adapter "i" may interfere with RT traffic received through adapter "j" in case of switch congestion.

To ensure proper transfer of information and solve the above-described switch congestion problems, a system constructed in accordance with the present invention is provided with a spacing mechanism such that, under normal operating conditions and based on the reserved bandwidth parameters, the available switch transmission bandwidth is only partially utilized. In other word, the spacing mechanism can be used to reduce the rate of transfer of data to the switch fabric. This creates the possibility of subsequently, partially or totally, neutralizing the spacing mechanism to increase the switch input rate whenever required to deal with switch congestion problems.

For example, there will be times the switch will be in the process of transferring a low priority packet when a higher priority packet is received. In such a case, the spacing mechanism can be overridden so that the current low priority packet is transferred to the switch fabric as quickly as possible to make way for the higher priority packet.

Normally, when a packet is received from the line, it is stored in a buffer memory up to K kilobytes (K is a system parameter) and is sent to the switch at the adapter internal speed, which often corresponds to the switch speed.

A large packet, which must be segmented into several cells for handling within the switch, will always cause a number of successive cells to be forwarded to the same output line at a high rate since the switch speed is always higher than the line speed.

Thus, large low priority (NRT/NR) packets being transferred on low speed lines may induce switch congestion and negatively impact real-time (RT) traffic performance of the whole system.

To limit this effect, the spacing function is implemented as follows. The cells are sent to the switch every X cycles; the value of X mainly depends on receive line speed, and is chosen in such a way that it verifies the relation:

$$X < E \frac{(0.7 * \text{switch speed})}{\text{line speed}} \quad (3)$$

Spacing is implemented only for NRT and NR flows, in part, because spacing causes delays in switching. However, NRT/NR data is not delay sensitive. Also, the larger the packet, the more useful the function. Small packets (1 cell) can only be sent from the adapter at line speed. However, when a large packet is received, the train of cells is sent after reception of the whole packet at adapter speed.

The spacing function improves the switch behavior and fairness on an overall machine basis, but may decrease RT performance at a given adapter. To deal with that, the case of a RT cell arriving while a NRT/NR data is being spaced must be considered. If the switch interface is multi-user, the RT cell will be transferred directly through the switch before NRT/NR cells due to its higher level of priority. However, if the switch interface is single-user, the RT cell must wait until the end of an NRT/NR packet currently being switched. In this last case, spacing must be disabled to limit impact of NRT/NR traffic on RT traffic.

Figure 5:
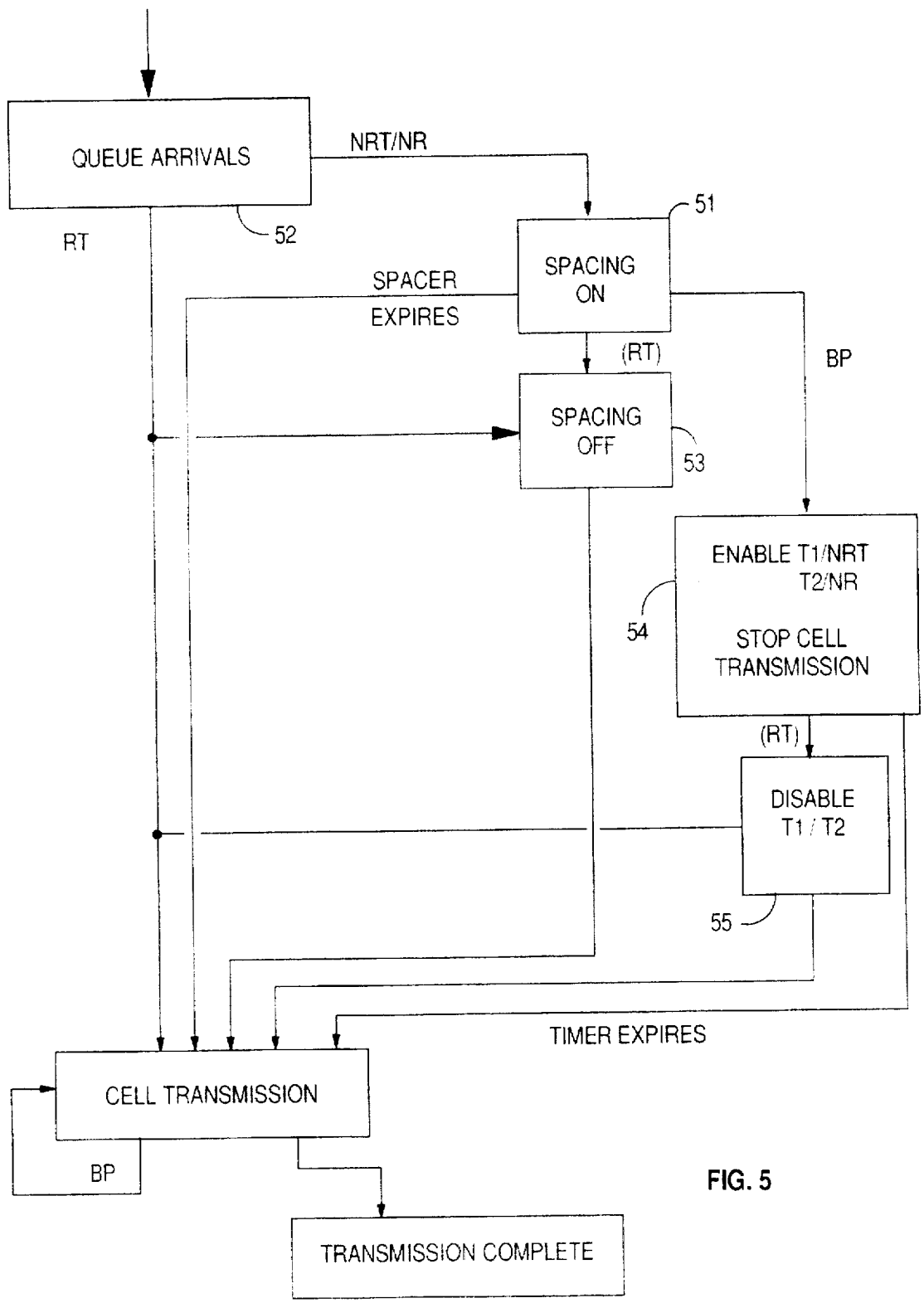
FIG. 5 is a general flowchart of a method for implementing this invention.

FIG. 5 is a flow-chart of operations which implement a basic form of the above-described mechanism for controlling switch congestion. Assume a switch fabric can accept cells either at 266 Mbps or (with the spacing function enabled) at 45 Mbps. A receive adapter manager module sets the spacing function ON, enabling adapter operation at 45 Mbps (see box 51). The receive adapter manager module and the its associated receive switch interface (RSI) continually monitor the input queues for that receive adapter. As long as the input data traffic is limited to NRT or NR data, the spacing operation remains ON. However, when input RT traffic is detected, the spacing function is disabled or turned OFF and the switch accepts input data at 266 Mbps.

A improved congestion control mechanism may also be implemented to take into consideration the amount of input traffic stored in various queues levels as compared to predefined threshold levels. This feature is described later with reference to FIGS. 7 through 9.

Although the basic spacing function already described improves steady-state switch behavior, a further improvement is possible where the switch is already operating under congestion conditions. To that end, timers are provided. If congestion (as defined earlier) occurs when a NRT/NR packet is being transmitted, a timer is set, and packet transmission is completely stopped on the given adapter(s) for a period defined by the timer. Each adapter switch interface manager sets such timers independently, upon reception of the backpressure signal from the switch. Then, NRT and NR traffic, which might otherwise increase the congestion period, is temporarily stopped at the receive adapter level, which allows the switch to return to a steady state behavior. There can be two timer values T1 and T2. Timer value T1 is used where an NRT packet is being transmitted when congestion is detected. Timer value T2 is used where an NR packet is being transmitted when congestion is detected. T2 is preferably larger than T1 to induce a "priority" between NRT and NR packets. Typically, T1 and T2 values should be between 1 and 10 switch cell cycles. If the timer values are too small, the switch will not have time to return to a steady state and the premature resumption of transmission of NRT/NR packets will again induce congestion. If the T1 and T2 values are too great, data may remain in input queues for excessive periods of time before being transferred to the switch fabric. The block diagram of FIG. 5 shows the operation of such timers.

The operation of the enable timer function 54 is triggered by a backpressure (BP) signal indicating the existence of congestion conditions. Whenever an active timer (T1 or T2) expires, cell transmission is normally resumed in the receive adapter. However, if input RT traffic is detected, the timers are disabled (block 55) under specific conditions already described and to be described further in connection with FIG. 6, and again cell transmission is enabled at full switch speed, That is, when RT input traffic is detected, the spacing function is disabled or overridden.

Figure 6:
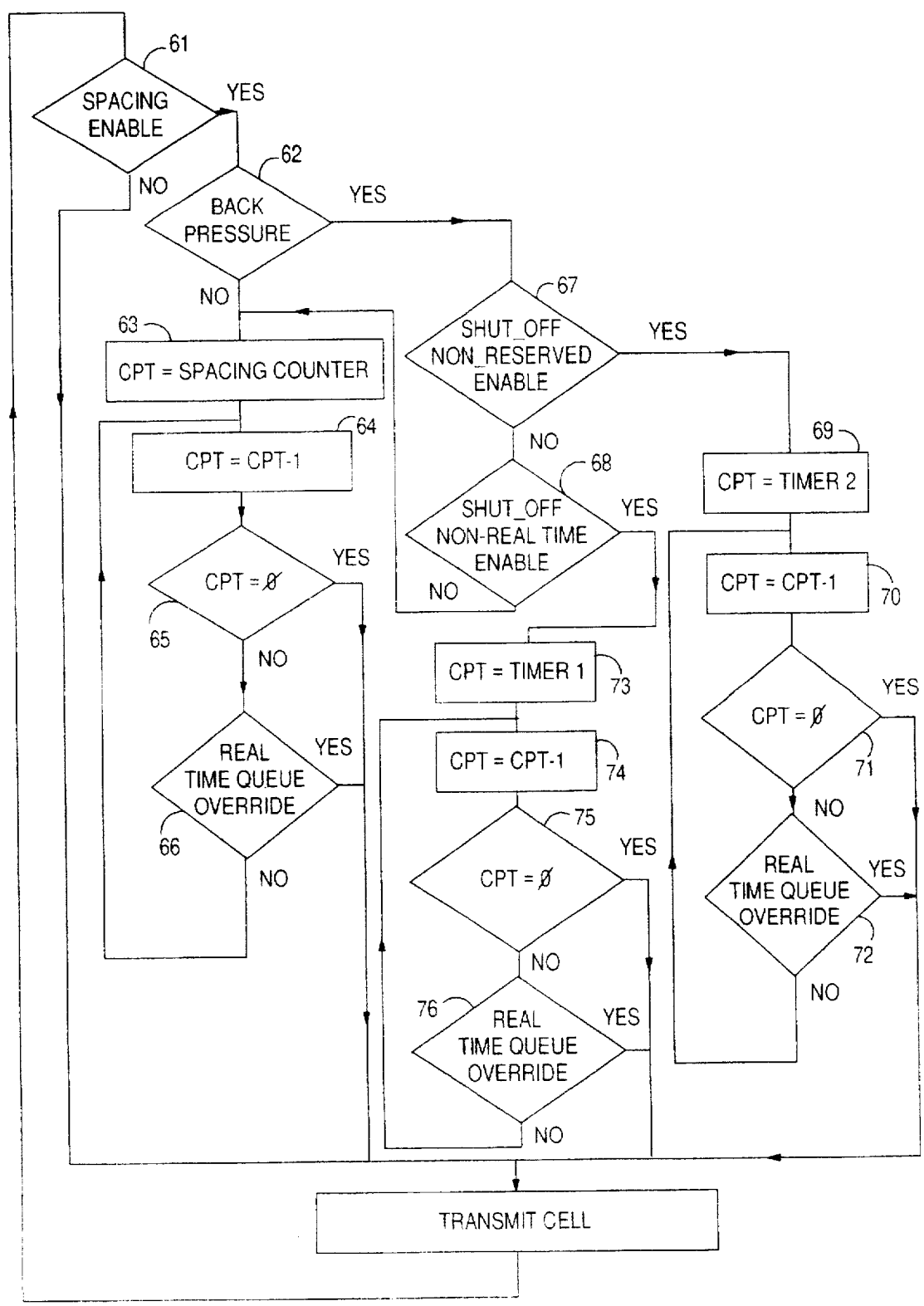
FIG. 6 is a more detailed representation of an algorithm for implementing the invention.

Details of the process for controlling the spacing mechanism are shown in FIG. 6. First, a test (step 61) is made to test whether spacing is ON. If spacing is disabled, a cell is transmitted normally; that is, at high switch speeds. On the contrary, if spacing is found to be ON, a test (62) is performed for the existence of a backpressure signal. If no backpressure signal is found, a spacing counter is set (step 63) to a value based on the selected spacing criteria. Then the counter is periodically decremented (step 64) and its content is tested to detect a zero count condition (step 65). As long as the count is different from zero, the counter is decremented (step 64) unless an override condition due to the presence of RT traffic is detected (step 66). If the spacing counter count is at zero, or if an override queue condition is set, a cell is transmitted.

If the result of the step 62 test is positive, indicating the presence of a backpressure signal, a double test is performed (step 67 and 68). The first test checks whether the type of input traffic to be halted is NR traffic. If it is, a timer 2 is set to a count T2 (step 69). The count in timer 2 is then decremented (step 70) and tested (71) in a loop operation which may continue until test (71) shows the count has been decremented to zero. When a zero count is detected, transmission of the interrupted NR cell is resumed. The loop operation including tests (70) and (71) can be overridden if input RT traffic is detected in a step (72). As noted earlier, the detection of RT traffic overrides the spacing mechanism.

If the result of test (67) is negative, a similar test (step 68) is performed for NRT traffic shut-off conditions. An NRT shut-off mechanism, similar to the above-described NR mechanism goes into operation with a counter set to T1 if the result of test 68 is positive; that is, NRT traffic is to be halted. The T1 counter can then decremented in a loop operation, which continues either until a zero count occurs (permitting resumption of NRT cell transmission) or until input RT traffic is detected (test 76), requiring an immediate override of the spacing function.

In all instances, when a real-time queue override condition occurs, the switch response, as already noted, depends on whether the switch interface is multi-user or single-user. A single-user switch interface prohibits interleaving of cells from different packets during their transmission through the switch when issued from the same adapter. For a multi-user switch interface, cells of different packets issued from a given adapter can be interleaved. In a multi-user environment, when different classes of traffic are supported, a packet with a lower priority can be preempted by a higher priority packet. In such a case, some cells from one packet are transmitted, then cells from another packet, and so on.

Accordingly, when a RT cell/packet arrives in an adapter during the transmission of a NRT/NR packet to the switch, the spacing mechanism is disabled. In the multi-user case, the RT cell is transferred directly to the switch fabric before any additional NRT/NR data. In the single-user case, the RT cell is not transferred until transmission of the current NRT/NR packet is completed.

The spacing function is required for large packets. For small ones, the spacing function may be ineffective and may even create congestion at the input queue level. For a line speed of 'M' bps, carrying 'b' bytes packets, the equivalent switch throughput (ST) necessary at switch level is $$ST = ((M*SCS)/b) * \tau(b'/SPL)\tau \quad (4)$$

where $$b' = b + OVH$$

τxτ is the smallest integer larger than x,

SCS is the size (in bytes) of the switch cell

SPL is the maximum number of bytes issued from the adapter, transmitted in a single switch cell (switch payload) or in other words, the useful portion of SCS.

OVH is an overhead representing the number of bytes added to the packet issued from the line in the input adapter (CRC, routing information, . . . )

For example, assuming a line operating at 52 Mbps, an overhead of 14 bytes, a switch payload of 48 bytes and a switch cell of 58 bytes, the equivalent switch throughput ranges from 430 Mbps to 63 Mbps for packet sizes ranging from 7 to 2048 bytes. It is clear that for a small packet size, the expression for x must be reduced to 1, while the formula given previously fits for large packets.

Figure 7:
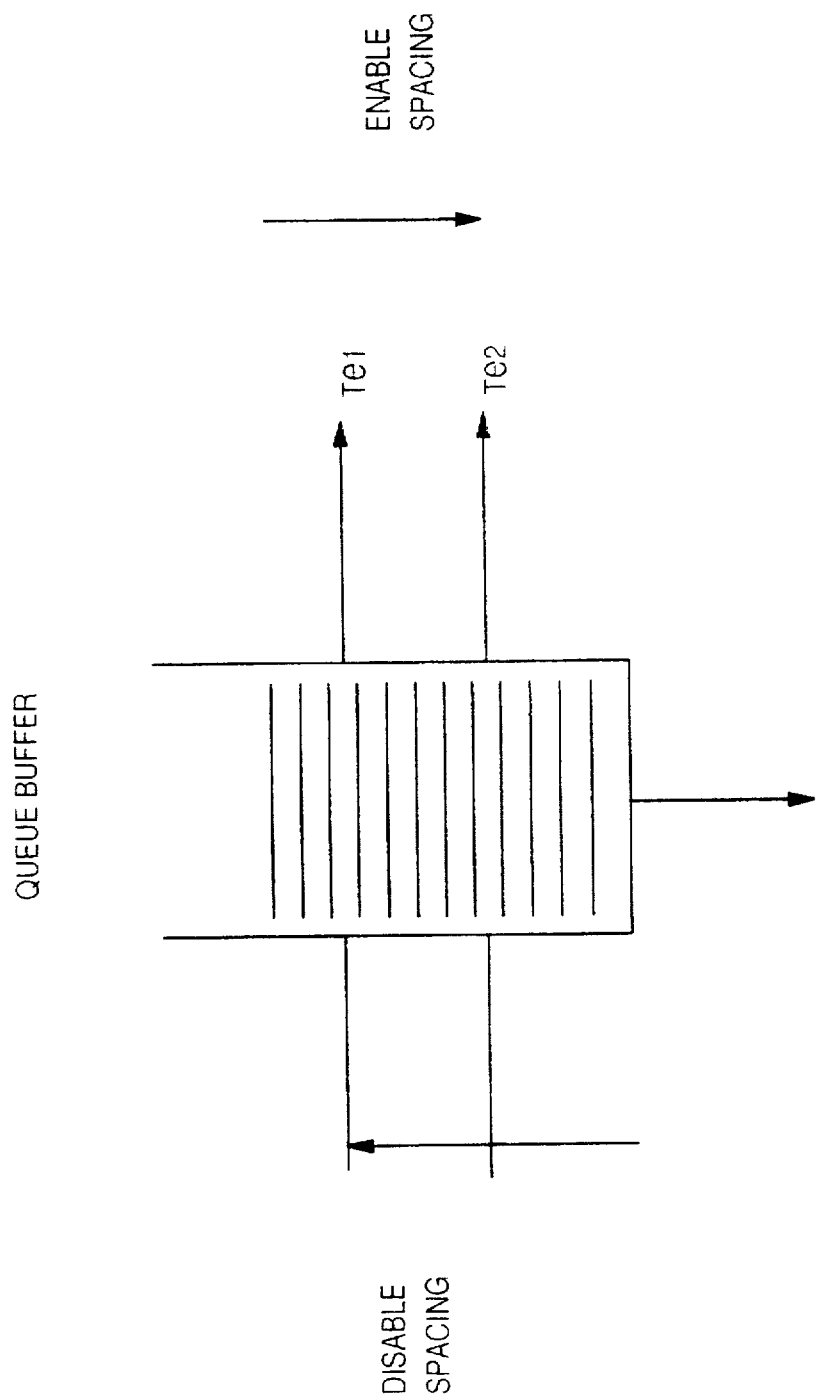
FIG. 7 is a schematic representation of a buffer management mechanism to be used in this invention.

In order to avoid this problem, the previously mentioned threshold controlled mechanism can be implemented in the adapter: switch input queues sizes are monitored and as soon as the number of cells queued reaches a threshold Te1, spacing is disabled; when a threshold Te2 is reached, the spacing is enabled again. FIG. 7 represents this mechanism.

In a preferred embodiment of this invention, threshold controlled spacing mechanism has been improved by being implemented with more than two specified threshold levels, with a predefined spacing ratio being assigned to each threshold condition.

Figure 8:
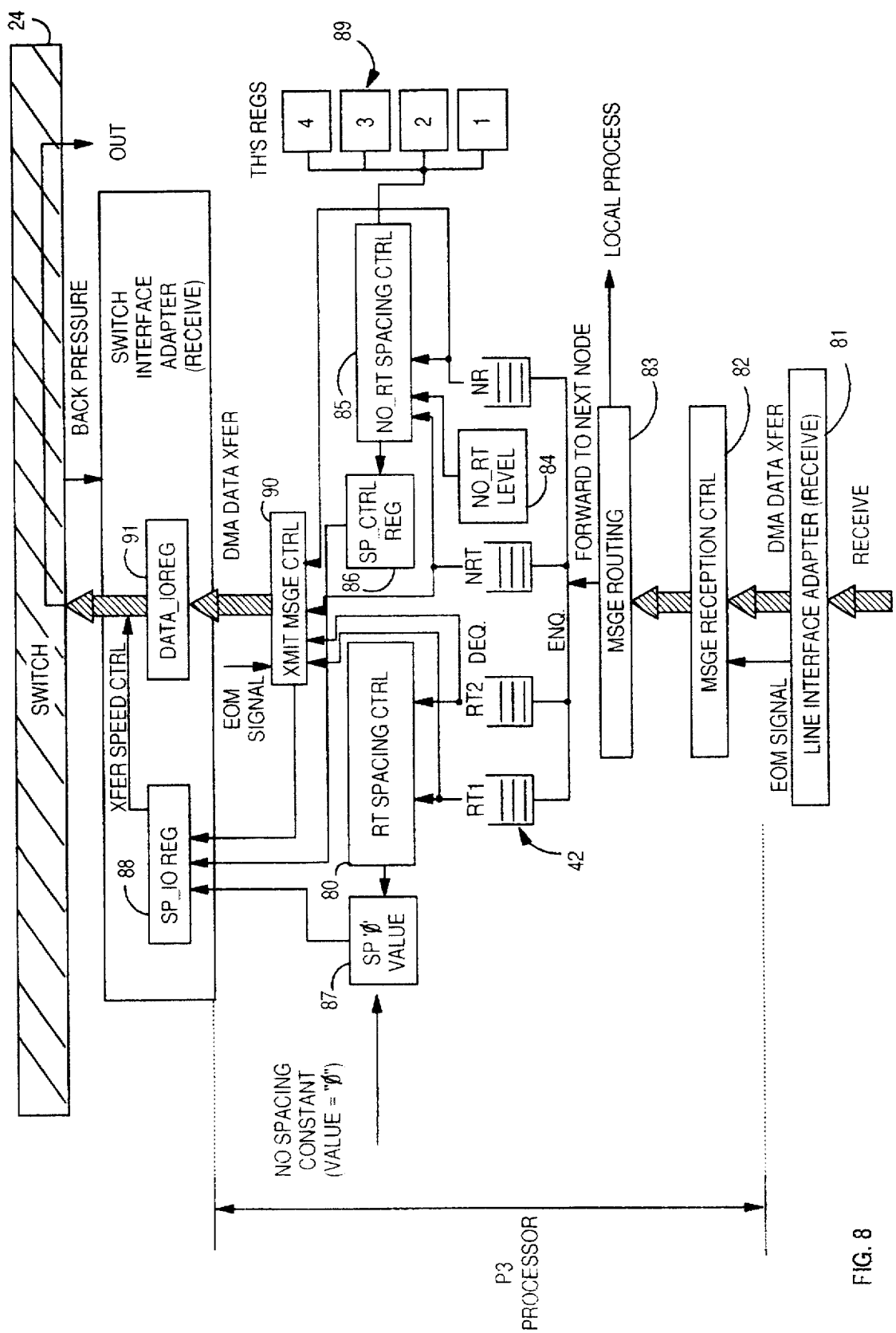
FIG. 8 is a more detailed block diagram representation of the buffer management mechanism of FIG. 7.

FIG. 8 is a block diagram showing an implementation of the threshold controlled spacing mechanism using four threshold levels. This figure also provides a more detailed description of the receive adapter shown generally in FIG. 4.

The routing device (see 41 in FIG. 4) is represented as including a Line Interface Adapter (81) performing conventional packet reassembly operations, whereby DMA data and end of message (EOM) signals are prepared and forwarded to a Message Reception Control (MSGE Reception CTRL) device (82) wherein the message is controlled prior to being forwarded to a Message Routing device (83). If the message includes errors, it is discarded by the message routing device (83); that is, is not forwarded to the switch. The message may be addressed to the local node, in which case it should also not be forwarded to the switch. That may be the case for a network control message destined for the local node in the course of a connection set-up or in topology information broadcast.

Receive adapter queuing (see 42 in FIG. 4) has been implemented in the system of FIG. 8 to process non-real-time (NRT), non-reserved (NR) and real-time (RT) traffic, with real-time traffic classified as having either RT1 and RT2 priority, with the highest priority being assigned to RT1, next highest priority being assigned to RT2, then NRT and finally NR. A counter (NO_RT Level) (84) connected to both NRT and NR queues is used to indicate the total number of message bytes in both NRT and NR queues. This counter is incremented at message reception (enqueue time) and decremented at message transmission (dequeue time).

While all enqueuing (ENQ) operations are controlled by the message routing device (83), dequeuings are represented as being performed separately in an RT Spacing CTRL device (80) for both RT1 and RT2 traffic and in a device NO_RT Spacing CTRL (85) for NRT and NR traffic. One should, however, understand that these operations are all performed, as already mentioned, in the programmable processor designated as P3 processor. The NO_RT Spacing CTRL device (85) is connected to an SP_CTRL register (86) containing the values of spacing (coded 0 through 4) to be used for sending Non-real-time messages to the switch. In the preferred embodiment of this invention, "0" corresponds to full speed (i. e. 266 Mbps), and "1", "2", "3" and "4" correspond to $4/5$, $3/5$, $2/5$ and $1/5$ of full speed, respectively. As already mentioned, real-time traffic shall be transferred at "0" spacing (see 87). The spacing values "0" through "4", stored into (86) or (87) are to be set into a switch interface I/O register SP_IOREG (88). Also, as already mentioned four threshold values (numbered TH1, TH2, TH3 and TH4) have been defined and stored into TH's Registers (89). In the preferred embodiment, these thresholds have been selected to be set at 10 Mbps, 15 Mbps, 20 Mbps and 25 Mbps for TH1, TH2, TH3 and TH4 respectively: But means are provided for enabling the network designer to configure these values at will.

The queued data is dequeued through a "transmit message" control device (XMIT MSGE CTRL) (90) in DMA form, and then forwarded to the switch via a register (DATA IOREG) (91) located in the receive switch interface adapter. The rate for transferring the data from the DATA_IOREG to the switch is controlled by the SP_IOREG content. In other words, enabling and disabling of spacing is controlled by register SP_IOREG.

Figure 9:
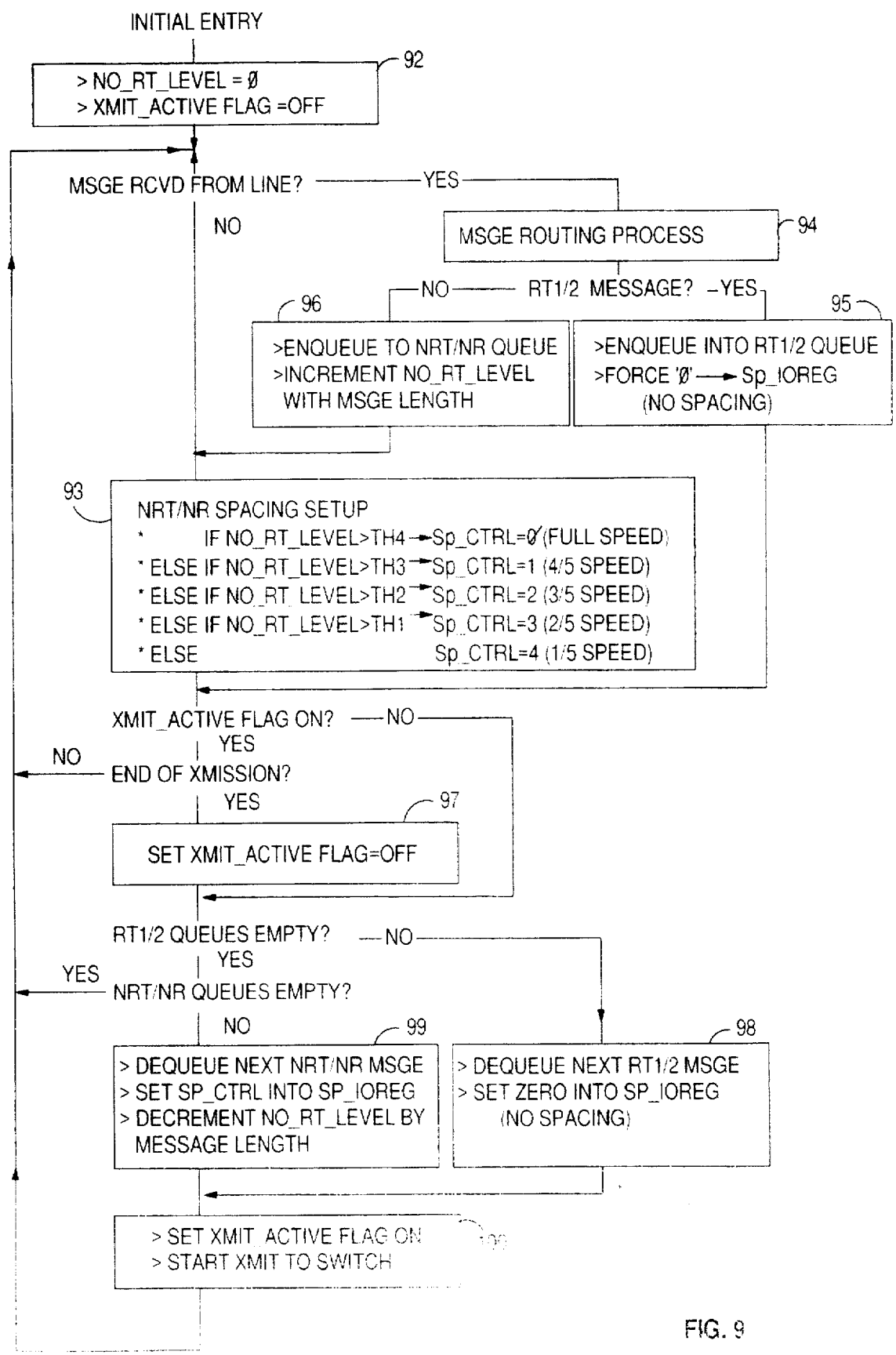
FIG. 9 is a detailed flowchart of an implementation of one embodiment of the invention.

Represented in FIG. 9 is the spacing control flowchart as implemented to take into consideration the four threshold levels as defined above. Upon initial entry, the total number of bytes present in both NRT and NR queues is zero and a flag (Xmit_active flag), indicating whether a message is being transmitted to the receive switch interface (RSI), is set OFF to indicate that no message is being transmitted (step 92). The message reception control is exercised to test whether a message is received from an input line. In case of negative answer, the NRT/NR spacing mechanism is set-up (step 93) to its desired value by testing the No_RT_Level with the following algorithm:

IF No_RT_Level>TH4→Sp_CTRL=0 (Full speed)
ELSE IF No_RT_Level>TH3→Sp_CTRL=1 (4/5 speed)
ELSE IF No_RT_Level>TH2→Sp_CTRL=2 (3/5 speed)
ELSE IF No_RT_Level>TH1→Sp_CTRL=3 (2/5 speed)
ELSE→Sp_CTRL=4 (1/5 speed)

If a message is received from the line, a message routing process is started (94) by first checking whether it is a real-time message. If this is the case, the message is enqueued into RT1 or RT2 buffer according to the received data, and the switch interface I/O register (Sp_IOREG) content is forced to "0" (step 95) and the process goes to the step wherein the flag, indicating whether a message is being transmitted to the switch interface, is tested. Otherwise, if the received message is not a real-time message, it is enqueued to NRT or NR queues and the counter No_RT_Level is incremented (step 96). The process then goes to step 93 and then to a test which checks whether the Xmit_Active flag is ON. If the flag is ON, the process checks for end of transmission. If this is not the case, the process loops back to checking whether a message is received from the line. In case of end of transmission, the Xmit_Active flag is set OFF (step 97). Once this flag is set OFF or should this setting OFF be indicated by the test performed on said flag, a test is performed on RT1/RT2 queue contents. If both are empty, then a test is performed on NRT/NR queues to see if these queues are empty. If they are, the process checks whether a message is received from the line. If either of the RT1 or RT2 queues is not empty, the queue contents are read out and the SP_IOREG contents is set to "0" (step 98). Otherwise, if either NRT or NR queues is found to contain data, the next NRT/NR message would be extracted from the corresponding queue(s), the content of Sp_CTRL register would be transferred into SP_IOREG and the counter No_RT_Level content would be decremented by the considered message length (step 99). Both steps 98 and 99 connect to step 100 where a flag indicating whether a message is being transmitted to the switch interface is set ON and transmission to the switch starts.

While there have been described what are considered to be preferred embodiments of the invention, variations and modifications to the preferred embodiments will occur to those skilled in the art once they learn of the basic inventive concepts. Therefore it is intended that the appended claims shall be construed to include the preferred embodiments and all such variations and modifications as fall within the true spirit and scope of the invention.

What is claimed is:

1. For use in a data communications network wherein data packets having assigned priority levels are transported between network nodes interconnected by transmission links and wherein one or more of the network nodes includes a multi-port switch for switching packets received on any of a plurality of input lines to any of a plurality of output lines, said switch comprising a plurality of receive adapters, each of which is connected to an input line and includes multiple input buffers for enqueueing received packets as a function of the priority levels of those packets, a plurality of transmit adapters, each of which is connected to an output line, a switch fabric for directing a packet provided from one of the multiple input buffers in one of the receive adapters to one of the transmit adapters, said switch fabric being capable of transferring packets from receive adapters to transmit adapters at a predetermined transfer rate, an improved method of providing congestion control in the switch comprising the steps of:

monitoring the input buffers in each receive adapter for the presence of received packets having a predetermined priority level;

enabling a spacing function in the absence of received packets having the predetermined assigned priority level, said spacing function causing received packets having other than the predetermined priority level to be transferred to the switch fabric at a transfer rate lower than the predetermined packet transfer rate of the switch; and disabling the spacing function upon detection of the presence of packets having the predetermined priority level to increase the packet transfer rate to the predetermined packet transfer rate.

2. A method of providing congestion control as set forth in claim 1 wherein the predetermined priority level is assigned to real-time data, including voice and video data.

3. A method of providing congestion control as set forth in claim 2 wherein packets may be assigned one of at least three possible priority levels, two of which are lower than the predetermined priority level and wherein there are at least two packet transfer rates lower than the predetermined packet transfer rate.

4. A method of providing congestion control as set forth in claim 3 including the additional steps of:

defining a threshold level for each of the input buffers in the receive adapter;

monitor the input buffer contents to detect when the contents of an input buffer exceed the defined threshold level; and enabling the transfer of packets at a rate lower than the predetermined packet transfer rate by allowing the spacing function to be enabled only while the buffer contents remain below the threshold level, otherwise disabling the spacing function to cause packets to be transferred at the predetermined packet transfer rate.

5. For use in a data communications network wherein multi-priority packets are transported between network nodes interconnected by transmission lines capable of transporting packets at predetermined line rates and wherein one of more of the network nodes includes a multiport switch for switching packets received on any of a plurality of input lines to any of a plurality of output lines at packet transfer rates up to a predetermined maximum packet transfer rate, an improved method for providing switch congestion control comprising the steps of:

causing the switch to transfer packets at a rate less than the maximum transfer rate only when no high priority packets are detected at the input to the multiport switch; and increasing the packet transfer rate to the maximum packet transfer rate if one or more high priority packets are detected at the input to the multiport switch.

6. For use in a data communications network wherein high priority level packets and lower priority level packets are transported between network nodes over interconnecting transmission lines, an improved multiport switch located in at least one of the network nodes, said improved multiport switch comprising:

a plurality of receive adapters, each of which is connected to an input line and includes multiple input buffers for enqueueing received packets as a function of the priority levels of those packets;

a plurality of transmit adapters, each of which is connected to an output line;

a switch fabric for directing a packet provided from one of the multiple input buffers in one of the receive adapters to one of the transmit adapters, said switch fabric being capable of transferring packets from receive adapters to transmit adapters at a predetermined transfer rate; and a manager module for causing enqueued packets to be transferred from the input buffers to the switch fabric at a rate not exceeding a first packet transfer rate provided no high priority packets are enqueued in the input buffers, said manager module causing enqueued packets to be transferred from the input buffers to the switch fabric at a second packet transfer rate higher than the first packet transfer rate if any high priority packets are detected in the input buffers.

7. An improved multiport switch as set forth in claim 6 wherein the lower priority level includes at least two different low priority levels and wherein the number of possible packet transfer rates which may be selected by the manager module equals the number of possible packet priority levels.

8. An improved multiport switch as set forth in claim 6 or claim 7 further including buffer registers for storing threshold values representing upper limits on the amount of data to be enqueued in each of the multiple input buffers;

a threshold detector for producing a limit signal when the amount of data enqueued in one of more of said multiple input buffers has exceeded the applicable threshold value; and means responsive to the limit signal to increase the rate at which packets are transferred from the receive adapter to the switching fabric.

* * * * *